United States Patent
Walsh (10) Patent No.: US 8,317,261 B2
(45) Date of Patent: Nov. 27, 2012

(54) BICYCLE SEAT HEIGHT ADJUSTING ASSEMBLY

(75) Inventor: Austin A. Walsh, West Newbury, MA (US)

(73) Assignee: Austin A. Walsh, West Newbury, MA (US)

( * ) Notice: Subject to any disclaimer, the term of this patent is extended or adjusted under 35 U.S.C. 154(b) by 140 days.

(21) Appl. No.: 12/960,707

(22) Filed: Dec. 6, 2010

(65) Prior Publication Data

US 2012/0104810 A1   May 3, 2012

Related U.S. Application Data

(60) Provisional application No. 61/409,895, filed on Nov. 3, 2010.

(51) Int. Cl.
  *B62J 1/00* (2006.01)
  *B62J 1/02* (2006.01)
(52) U.S. Cl. .................................. 297/215.13
(58) Field of Classification Search .............. 297/215.13
  See application file for complete search history.

(56) References Cited

U.S. PATENT DOCUMENTS

| | | | | |
|---|---|---|---|---|
| 3,861,740 A * | 1/1975 | Tajima et al. | ............ | 297/215.13 |
| 4,789,176 A * | 12/1988 | Carroll | ................. | 297/215.13 X |
| 5,236,169 A * | 8/1993 | Johnsen | ........................ | 248/561 |
| 5,713,555 A * | 2/1998 | Zurfluh et al. | ................ | 248/599 |
| 5,826,935 A * | 10/1998 | DeFreitas | ................. | 297/215.13 |
| 5,829,733 A * | 11/1998 | Becker | ........................... | 248/631 |
| 5,899,479 A * | 5/1999 | Schroder | .............. | 297/215.13 X |
| 6,220,581 B1 * | 4/2001 | Mueller | ..................... | 267/64.11 |
| 7,025,367 B2 * | 4/2006 | McKinnon | ................ | 280/288.4 |
| 7,083,180 B2 * | 8/2006 | Turner | ........................ | 280/287 |
| 7,306,206 B2 * | 12/2007 | Turner | ........................ | 267/64.12 |
| 7,673,936 B2 * | 3/2010 | Hsu | .......................... | 297/215.13 |
| 7,909,348 B2 * | 3/2011 | Klieber | ................ | 297/215.13 X |
| 2006/0175792 A1 * | 8/2006 | Sicz et al. | ............ | 297/215.13 X |
| 2010/0314917 A1 * | 12/2010 | Hsieh | ........................ | 297/215.13 |
| 2012/0104811 A1 * | 5/2012 | Hsieh | ........................ | 297/215.13 |

* cited by examiner

*Primary Examiner* — Rodney B White (57) ABSTRACT

A bicycle seat height adjusting assembly comprises of a seat post that axially slides into an insert tube that fits into a bicycle frame in the place of a conventional seat post. The front of the insert tube has a plurality of evenly spaced locking holes sized to receive a locking pin. The locking pin with supplemental spring is positioned within the lower section of the seat post. A main air spring is positioned within the seat post to keep the main air spring free from dirt interference, allow the post to fully rise and lower, and enable the use of a maximum height pre-adjustment system. A first longitudinal groove positioned along the inner wall of the insert tube contains a spline rod with wedging projections. The spline rod is connected to a cable that extends out to an actuation lever that is positioned on the handlebars. As the actuation lever is pulled, the wedging projections push the locking pin out of the locking holes where the main air spring causes the seat post to rise.

32 Claims, 9 Drawing Sheets

BICYCLE SEAT HEIGHT ADJUSTING ASSEMBLY

This application claims the benefit of provisional application No. 61/409,895, filed Nov. 3, 2010.

BACKGROUND OF THE INVENTION

This invention relates generally to a seat post that can be fully raised or lowered, particularly on a mountain bicycle while the cycle is in motion.

While a bicycle seat is positioned higher, the seated cyclist is able to exert a greater amount of force on the pedals. Yet, the bicycle is vastly more maneuverable while the seat is fully down and out of the way. While riding on trails that are steep and challengingly bumpy, this lower seat position gives the cyclist a lower center of gravity, to avoid being thrown off the bike. An adjusting seat post assembly should therefore have the capacity to be fully lowering and fully adjusting.

There are a number of height adjusting seat post designs that provide an upwardly urging spring mechanism and a post locking means. Yet, most of these designs are not capable of full adjustment as they are limited in their range of operation by the type of main spring that is used in combination with a locking system that often gets in the way by requiring much of the room inside of the seat post.

For the cyclist there is an exact seat height that yields the greatest amount of propulsion from the bicycle. A system that immediately positions the seat post into this personalized, exact maximum height will reduce the time and effort that would otherwise be spent making readjustments while riding the bicycle.

A remote lever that is positioned on the handlebars of the bicycle is required for keeping the cyclist safely attached to the bicycle. A seat post adjusting system that requires the cyclist to remove one hand from the handlebars while riding over bumpy terrain would possibly cause the cyclist to dangerously loose control of the bicycle.

A bicycle seat post needs to be strong and lightweight relative to the added performance that a seat post or any other bicycle component may bring to the bicycle. In the field of height adjusting seat posts, the seat post assembly should also be as light and strong as possible. A seat post that is tubular and without any weakening openings to the exposed tubular surface, should therefore make for the strongest and the lightest seat post configuration.

Bicycling on trails of dirt and mud, an adjusting seat post assembly must be as dirt poof as possible to maintain the products reliability. Height adjusting seat posts with any exposed perforations or lock openings positioned on it would increase the likelihood of dirt clogging the main locking system and further bringing dirt between the telescoping pieces.

Use of a main air spring should also decrease weight and increase strength from having a generally tubular type structure. An air sprung adjusting seat post should also have a lightweight air dampening system to keep the seat post from rising up too fast. Yet, the adjusting seat posts presented so far, all do not provide a fully capable, adjusting seat post.

Zurfluh, U.S. Pat. No. 5,713,555, Hsu, U.S. Pat. App. No. 2009/0108642, Turner, U.S. Pat. No. 7,083,180 and McAndrews, U.S. Pat. App. No. 2009/0324327 all present main air spring seat post designs. Yet, they all simply position the seat post within the main insert sleeve to form a main air spring. These previous designs are extremely sensitive to dirt, as their air seals can be broken by any dirt that gets onto the seat post and is then lowered into the main insert sleeve. All these other systems, also do not include a lightweight air dampening system or have the capacity to access a personally adjustable maximum height set system for achieving a full span of height adjustment.

Hsu, U.S. Pat. App. No. 2009/0108642, Turner, U.S. Pat. No. 7,083,180 and McAndrews, U.S. Pat. App. No. 2009/0324327 all present main adjusting seat post designs that require the cable for the actuation lever to come out of the top of the moving seat post. Having the cable extend from the top of the moving seat post to the top tube of the bicycle frame, where it is first attached to the bike, creates a hazardous situation where the cable loosely dangles and may get caught on a piece of the bike or onto the rider to accidentally trigger the upward release of the seat post. Such an unexpected release of the seat post could be very dangerous while riding down steep and bumpy terrain. Therefore, a seat post that is height adjusting while the bicycle is in motion needs to have the cable, for the remote actuator, exit the seat post assembly from a non-moving part of the seat post assembly.

OBJECTS AND ADVANTAGES

An object and advantage of the present invention is a seat post assembly that uses a counter rotational assembly for the seat post that does not allow the seat post to have any side to side play, whatsoever. The counter rotational device should slide well and not have enough friction as to bind when being used as this would halt the seat posts operation. The counter rotational device should also be highly durable as not to quickly wear out or cause even greater damage to the main post.

An object and advantage of the present invention is a seat post assembly that does not have any perforations or locking holes on the exterior surface of the seat post, to avoid any dirt from being brought into the locking or telescoping system where any dirt might cause scratching of the post or impeding of the lock system.

An object and advantage of the present invention is a seat post assembly that has a main inverted air spring that is positioned within the seat post to keep the air spring sealed and free from being impeded by dirt, which there is much of, often when mountain biking.

Another object and advantage of the present invention is a seat post assembly that incorporates a full span air spring design that is able to maintain a very even spring rate while fully rising and fully lowering.

Another object and advantage of the present invention is a seat post assembly containing this inverted, two chamber air spring design that further enables the use of a lightweight air dampening system that keeps the seat post from rising up too fast.

Another object and advantage of the present invention is a seat post assembly that utilizes a main air spring to provide a strong and lightweight adjusting seat post due to its high strength and lightweight tubular type structure.

Another object and advantage of the present invention is a seat post assembly that has a full span and range of locking positions, from a fully lowered position for maximum control, a multitude of middle positions for varying degrees of terrain challenge and a maximum seat height position that provides the most power and efficiency from the bicycle.

Another object and advantage of the present invention is a seat post assembly that has a capacity to personally adjust the maximum seat height that the seat post can rise to. Leg length and general comfort are the main factors when an individual is determining the maximum height that they want their seat to go, as the maximum height that the seat post is set at is different for almost everyone. By placing the air spring device within the seat post, this air spring devise also allows for a unique ability to place an opening into the initial insert tube section and gain access the lower outside of the seat post, where a maximum height adjustment devise is therefore able to be used and adjusted.

Another object and advantage of the present invention is a seat post assembly that incorporates a remote actuation lever that is positioned on the handlebars of the bike and therefore keeps the cyclist safely attached to the bicycle.

Another object and advantage of the present invention is a seat post assembly that does not connect the remote actuation lever to the seat posts locking device through the top of the moving seat post as this could cause the cable to catch on the bike or the rider and dangerously trigger the release of the seat post. Instead, the remote actuation lever safely connects by a cable to the stable insert tube section where the seat post locking mechanism is partially located.

DESCRIPTION OF THE PREFERRED EMBODIMENTS

Figure 1:
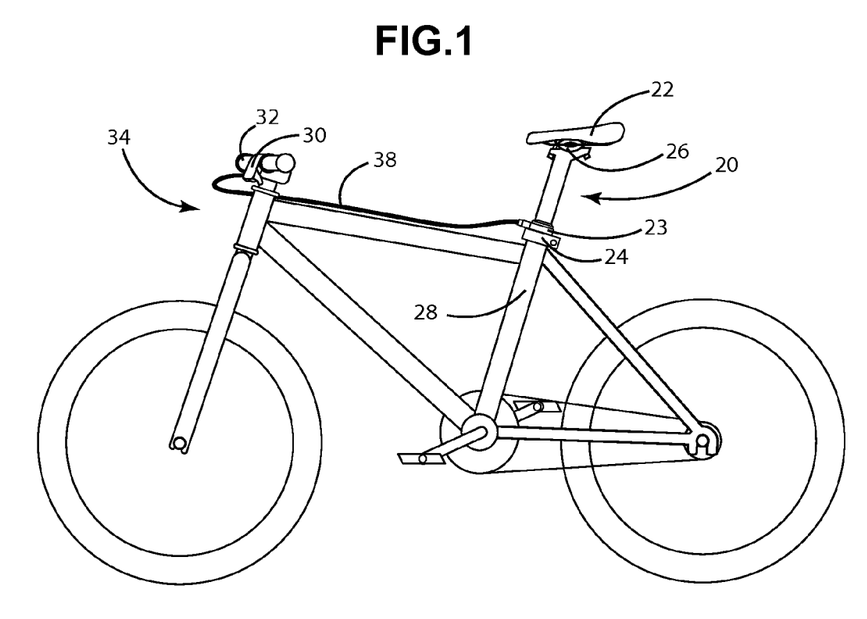
FIG. 1 is a side elevational view of a bicycle equipped with a bicycle seat height adjusting assembly according to one embodiment of this invention.

Referring now to the embodiment of the invention shown in FIG. 1, a new bicycle seat height adjusting assembly is presented and generally designated by the reference number 20. The seat height adjusting assembly 20 generally comprises a seat post 21 that is positioned within an insert tube 23. The insert tube 23 is shown inserted into the seat tube 28 of a bicycle frame 34. The insert tube 23 retrofits into the bicycle seat tube 28 in the place of a traditional seat post. The seat post 21 is adjustable up and down, being telescopically slidable within the insert tube 23. A cable housing 38 is shown extending outwardly from the upper portion of the insert tube 49. The cable housing is further connected to an actuation lever 15 that is positioned on the bicycle handlebar 32. The seat 22 is clamped to the top portion of the seat post 21 through any conventional clamping method 26. A post clamp 24 is positioned around the seat tube 28 of the bicycle frame 34 for fixedly securing the insert tube 23 with respect to the seat tube 28.

Referring now to the preferred embodiment of the invention shown in FIGS. 1 through 9, a third tubular structure 60 is positioned at the lower support platform 71 of the insert tube 23. The third tubular structure 60 extends up into the inner area 61 of the seat post 21. A fourth tubular structure 64 that has a closed top end and an open bottom end is positioned within the inner area 61 of the seat post 21. The third tubular structure 60 slides mainly within the fourth tubular structure 64. A perimeter air seal 68 positioned around the upper area of the third tubular structure 60 forms an air tight seal between the outer wall of the third tubular structure 60 and the inner wall of the fourth tubular structure 64 to form a first air chamber 62 and a second air chamber 65. The first air chamber 62 is formed within the third tubular structure 60. The second air chamber 65 is formed within the contained area of the fourth tubular structure 64. An air valve 70, such as a Schrader air valve, extends down from the bottom of the third tubular structure 60, through the support platform 71, to where the air valve 70 is capable of delivering pressurized air into the first air chamber 62, from an air pump type device.

Figures 2, 3, 4, 5:
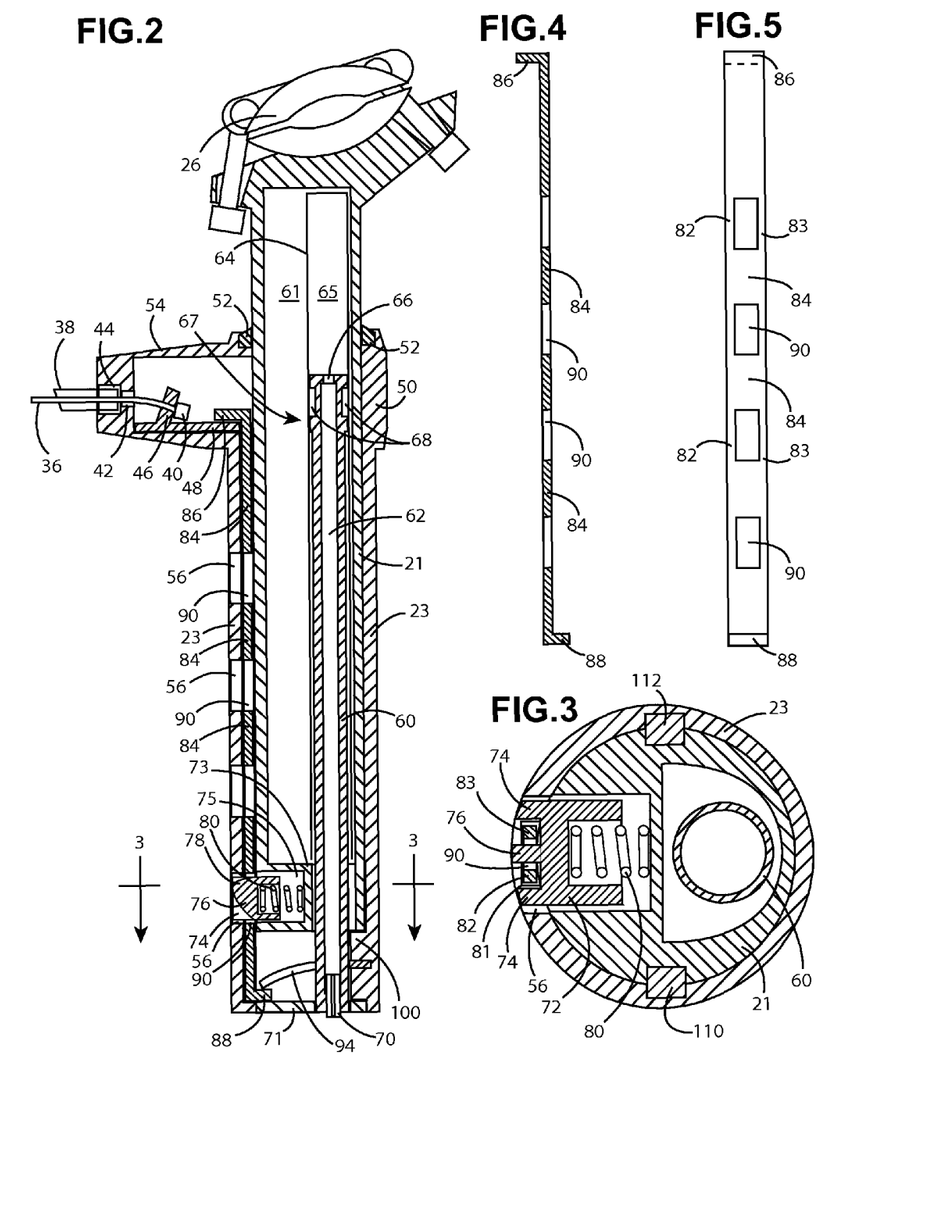
FIG. 2 is an enlarged sectioned side view of the seat post assembly illustrated in FIG. 1.
FIG. 3 is an enlarged horizontal cross-sectional view of FIG. 2 taken on line 3-3.
FIG. 4 is a sectioned side view of the spline un-locking device of FIG. 2.
FIG. 5 is a front view of the spline un-locking device of FIG. 4.

Air is pumped through the air valve 70 and travels into the first air chamber 62. An air damper opening 66 that is sized to control the speed of air flow, is positioned at the top of the third tubular structure 60. A portion of the air that is pumped into the first air chamber 62 will then travel through the air damper opening 66 of the first air chamber 62 and be further contained within the second air chamber 65. The air pressure increase within the first air chamber 62 and the second air chamber 65 further causes the air within the second air chamber 65 to want to expand and push up on the top surface of the fourth tubular structure 64 and expand to push down on the third tubular structure 60. As the third tubular structure 60 is held in place by the stationary insert tube 23, the pressurized air within the first air chamber 62 and the second air chamber 65, forms a main air spring unit 67 that urges the seat post 58 to rise. The air damper opening 66 will restrain the seat post 21 from rising too fast.

Figures 6, 7:
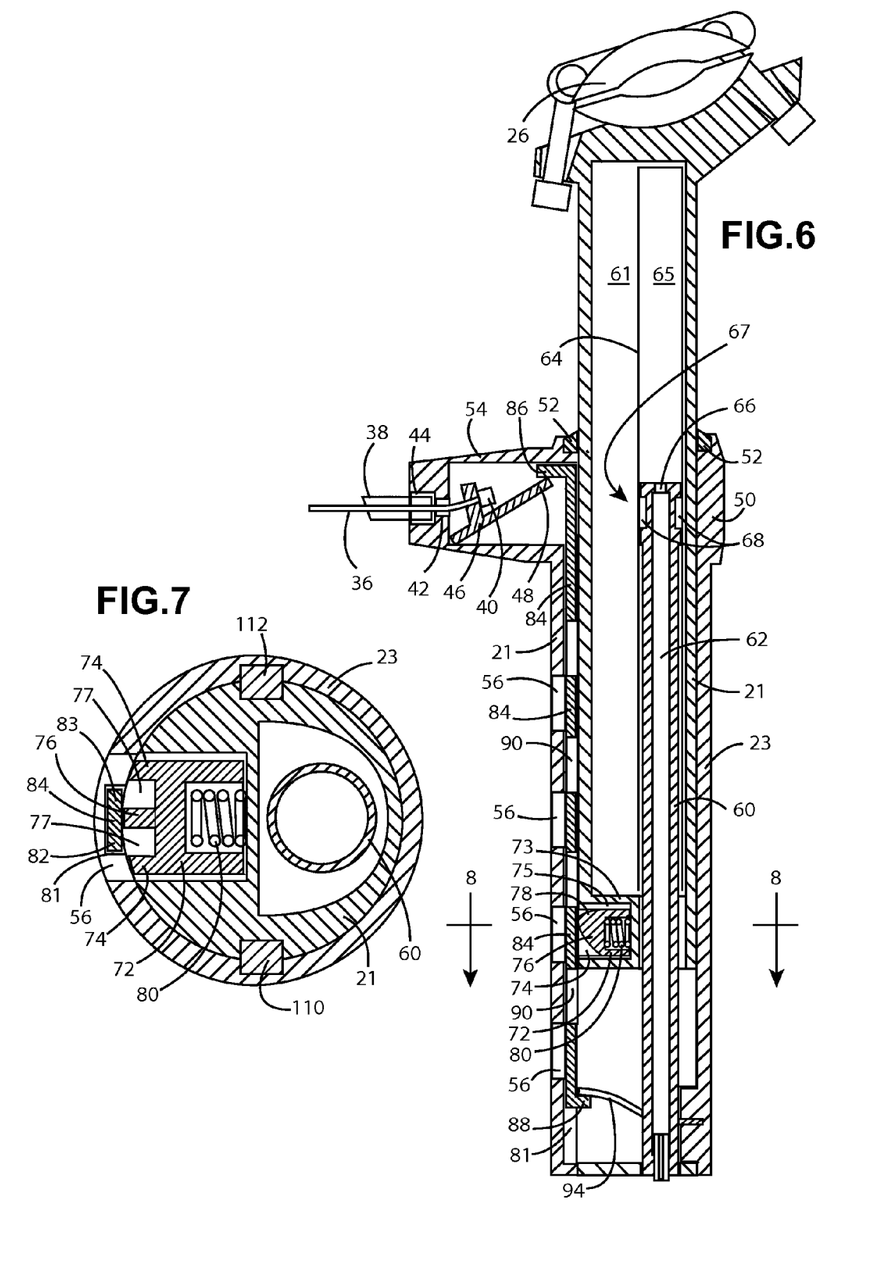
FIG. 6 is a view similar to FIG. 2 of the seat post in an unlocked position.
FIG. 7 is an enlarged horizontal cross-sectional view of FIG. 6 taken on line 7-7.

FIGS. 2 and 6 show a row of locking holes 56 that are positioned along the front side of the insert tube 23. A locking pin 72 that is square in profile, is positioned within a lock housing 73 that is positioned at the bottom section of the seat post 21. The locking pin 72 is positioned on the lower front side of the seat post 21 so that the locking pin 72 is able to enter into one of the lock holes 56. The locking pin 72 has a supplemental spring 80 positioned against the back wall of the lock housing 73 that pushes the locking pin 72 outward and into one of the lock holes 56.

To push the locking pin 72 out of the lock holes 56, a first groove 81 is formed in centered alignment with the lock holes 56, along the inner wall of the insert tube 23. A first spline rod 82 and a second spline rod 83 have flat wedging projections 84 extending from the first spline rod 82 to the second spline rod 83. The first spline rod 82 and the second spline rod 83 are positioned against the back wall of the first groove 81. The depth of the first spline rod 82, the second spline rod 83 and the flat wedging projections 84 are all equal to the depth of the first groove 81. The height of each of the flat wedging projections 84 is equal to the height of each of the lock holes 56. The first spline rod 82 and second spline rod 83 connect at their top to form an outward pointing holder 86. The first spline rod 82 and second spline rod 83 connect at their bottom to form an inward pointing holder 88. Each of the flat wedging projections 84 is positioned to be pulled up and in front of a portion of each one of the lock holes 56 as the outward pointing holder 86 is lifted.

A supplemental wedge 76 is positioned at the outer edge of the locking pin 72. The locking pin 72 has outer locking dog edges 74,74 that are rounded to fit and lock into the curve of the locking holes 56. Slots 77,77 are positioned on either side of the supplemental wedge 76 to let the first spline rod 82 and second spline rod 83 enter into the slots 77,77 as the locking dog edges 74,74 are pushed into one of the lock holes 56. Projection openings 90 are positioned between each of the flat wedging projections 84. The supplemental wedge 76 fits through one of the projection openings 90 when the locking dog edges 74,74 are locked into one of the locking holes 56.

As shown in FIGS. 6 and 7, when the flat wedging projections 84 are lifted, one of the flat wedging projections 84 pushes back the supplemental wedge 76 to push the outer locking dog edges 74,74 out of one of the lock holes 56 to unlock the locking pin 72 from the lock holes 56. The main air spring unit 67 is then able to expand and force the seat post 21 to rise, with the locking pin 72 being fully pushed out of the locking holes 56. Each of the flat wedging projections 84 is now positioned up and in front of a portion of each one of the lock holes 56. The supplemental wedge 76 has a return curve 78 positioned at the outer portion of the supplemental wedge 76 to enable the supplemental wedge 76 to slide up and over each of the flat wedging projections 84 as the seat post 21 rises. The outer portion of the supplemental wedge 76 further extends outward a small amount more then the locking dog edges 74,74, so that the locking dog edges 74,74 do not engage any one of the lock holes 56 as the seat post 58 rises or lowers.

A cable 36 first attaches onto the actuation lever 30 that is positioned on the handlebar 32. The cable 36 extends through the cable housing 38. The cable 36 further extends from the cable housing 38, into the cable opening 42 that is positioned on the front of the collar protrusion 54. Within the collar protrusion 54 is a protrusion chamber that contains the outward pointing holder 86 and a leveraging arm 46 of a pivoting lift rod 48. The cable end barb 40 is then positioned within the leveraging arm 46 of the pivoting lift rod 48. The end of the pivoting lift rod 48 is positioned under the outward pointing holder 86. As the cyclist pulls the actuation lever 30, the cable end barb 40 pulls the lifting rod 48 up, to push the outward pointing holder 86 up and thereby unlock the locking pin 72 from one of the locking holes 56.

Referring back to FIGS. 1,2 and 3, when the cyclist releases the actuation lever 30 the flat wedging projections 84 are no longer being pulled upwards, as a return leaf spring 94 pulls the inward pointing holder 88 back down. As the flat wedging projections 84 are pulled down and away from the openings to the lock holes 56, the locking dog edges 74,74 are able to re-enter into any one of the lock holes 56 and re-lock the seat post 21 at a given height.

FIGS. 4 and 5 distinctly show the first spline rod 82 and the second spline rod 83 with the flat wedging projections 84 extending from the first spline rod 82 to the second spline rod 83. The outward pointing holder 86 and the inward pointing holder 88 are also shown. The projection openings 90 are shown positioned between each of the flat wedging projections 84.

Referring now to FIGS. 2 and 3, there are a number of other details of interest. A wiper seal 52 is positioned around the seat post 21. The wiper seal 52 is positioned within the top section of the insert tube 23. The wiper seal 52 will shed mud off the seat post 21 and keep mud from entering into the insert tube 23. A limiting platform 100 is formed at the lower portion of the insert tube 23 to limit the downward motion of the seat post 21. The insert tube 23 has a slight collar 50 at the upper portion that acts to limit the insert tube 23 from sliding entirely into the bicycle frame seat tube 28. A cable housing opening 44 is also shown just in front of the cable opening 42. A first counter rotational boss 110 and a second counter rotational boss 112 are shown in FIG. 3 and also shown in FIG. 9.

Figure 9:
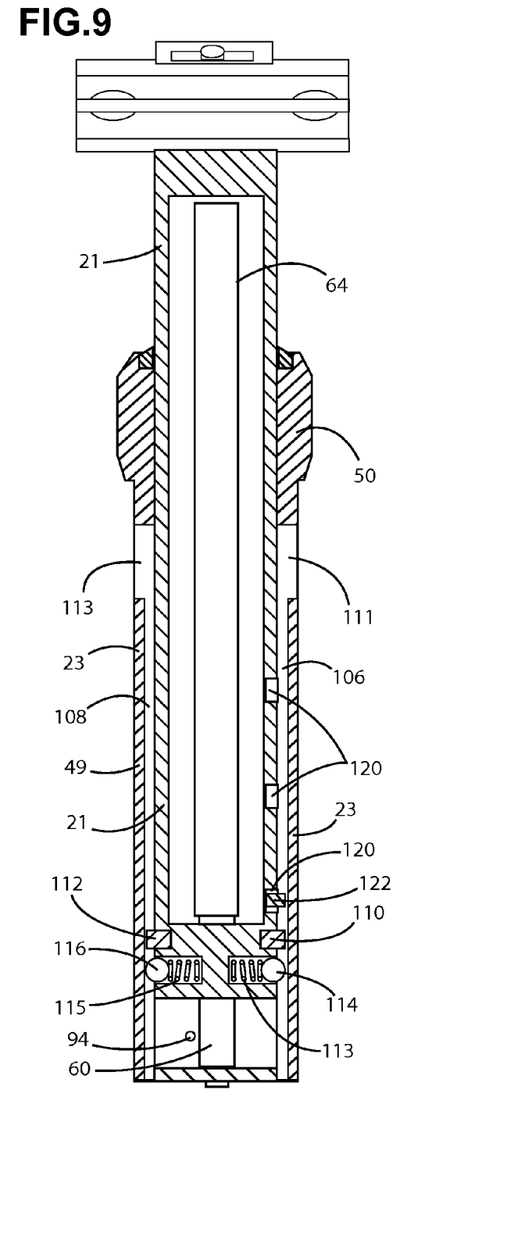
FIG. 9 is a sectioned front view of the seat post assembly illustrated in FIG. 8.

Referring now to FIG. 9, the first counter rotational boss 110 and the second counter rotational boss 112 are shown attached to the lower section of the seat post 21. A second groove 106 is formed longitudinally within a second side of the inner wall of the insert tube 23. The first counter rotational boss 110 slides within the second groove 106 to keep the seat post 21 from rotating relative to the insert tube 23. A third groove 108 is formed longitudinally within a third side of the inner wall of the insert tube 23. The second counter rotational boss 112 slides within the third channel 108 to further to keep the seat post 21 from rotating relative to the insert tube 23.

A first ball bearing 114 with a second supplemental spring 115 is positioned within the seat post 21, below said first boss 110. The first ball bearing 114 slides partially within the second groove 106 and is pressed outwardly by the second supplemental spring 115, to eliminate the smallest rotational movements by the seat post 21.

A second ball bearing 116 with a third supplemental spring 117 is positioned within the seat post 21, below said second boss 112. The second ball bearing 116 slides partially within the third groove 108 and is pressed outwardly by the second supplemental spring, to further eliminate the smallest rotational movements by the seat post 21.

A maximum height limiting system is shown in FIG. 9. A plurality of threaded openings 120 are formed into the exterior wall of the seat post 21, above the first counter rotational boss 110. A maximum height set screw 122 is positioned within one of the threaded openings 120. The maximum height set screw 122 slides partially within the second groove 106. The maximum height set screw 122 is limited in its upward movement by the top surface of the second groove 106. Positioning of the maximum height set screw 122, into one of the threaded openings 120, limits how high the seat post 21 is able to raise. The threaded openings 120 of the maximum height adjust system are meant to be present on only the lowest section of the seat post 21 where they are only needed, as not to require any threaded openings 120 to be visible once the seat post assembly 20 is installed in the bicycle frame 34.

Figure 8:
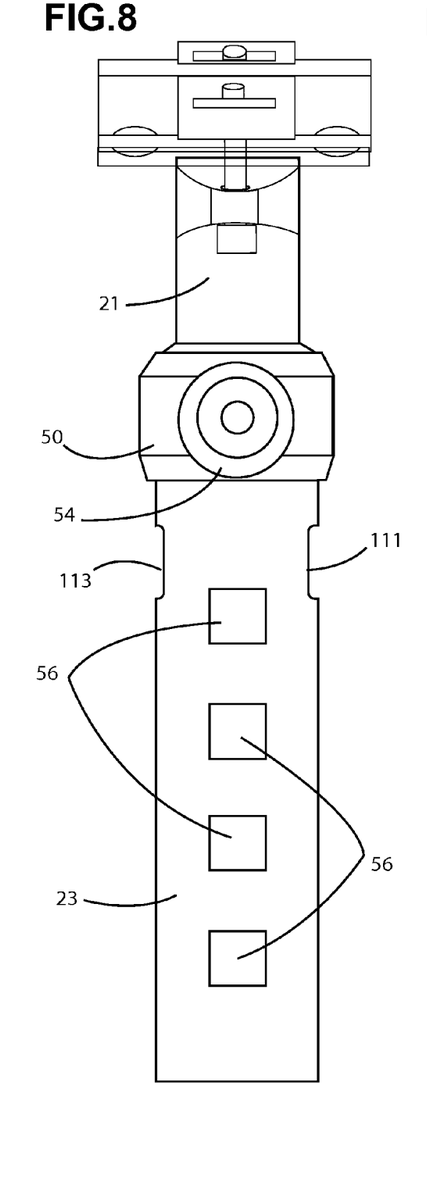
FIG. 8 is a front view of the seat post assembly illustrated in FIG. 7.

FIGS. 8 and 9 show a second groove opening 111 and a third groove opening 113. The second groove opening 111 allows for the adding and the removal of the maximum height set screw 122, the first boss 110, the first ball bearing 114 and the second supplemental spring 115 from the seat post 21. The third groove opening 113 allows for the adding or removing of the second boss 112, the second ball bearing 116 and the third supplemental spring 117 from the seat post 21. FIG. 8 further shows the lock holes 56 positioned through the front of the insert tube 23.

Figure 10:
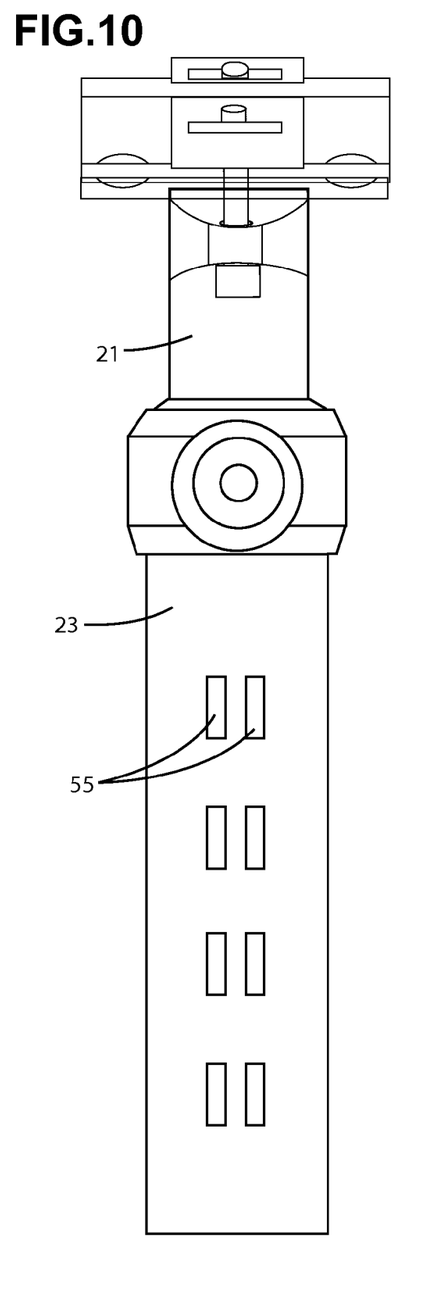
FIG. 10 is a view similar to FIG. 8 of another embodiment of the invention.

FIG. 10 presents the same embodiment of the invention as presented in FIGS. 1 through 9 except that each of the lock holes 56 are divided into double lock holes 55,55 to accommodate one of the locking dog portion 74 and the supplemental wedge 76 separately.

Figure 11:
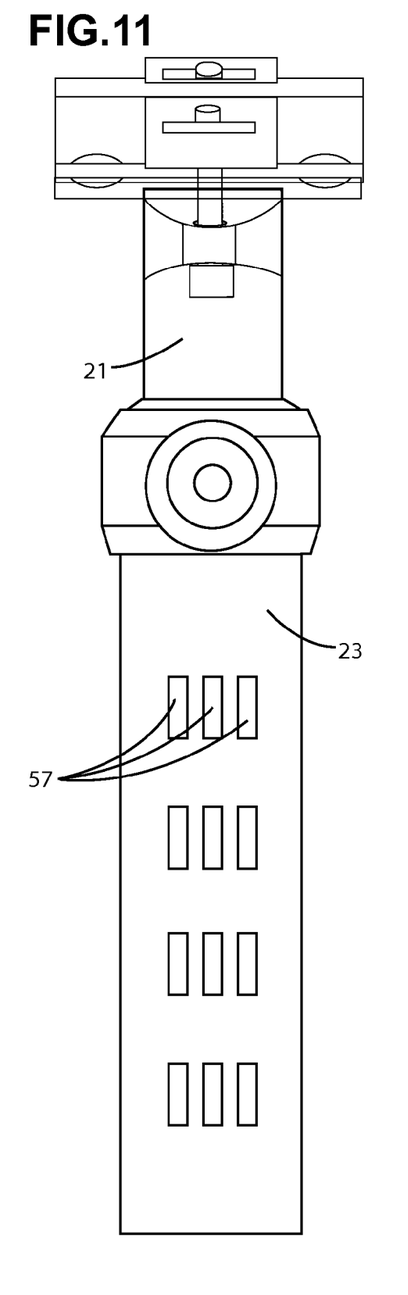
FIG. 11 is a view similar to FIG. 10 of another embodiment of the invention.

FIG. 11 presents the same embodiment of the invention as presented in FIGS. 1 through 9 except that each of the lock holes 56 are divided into triple lock holes 57,57,57 to accommodate the locking dog portions 74,74 and the supplemental wedge 76 separately.

Figure 12:
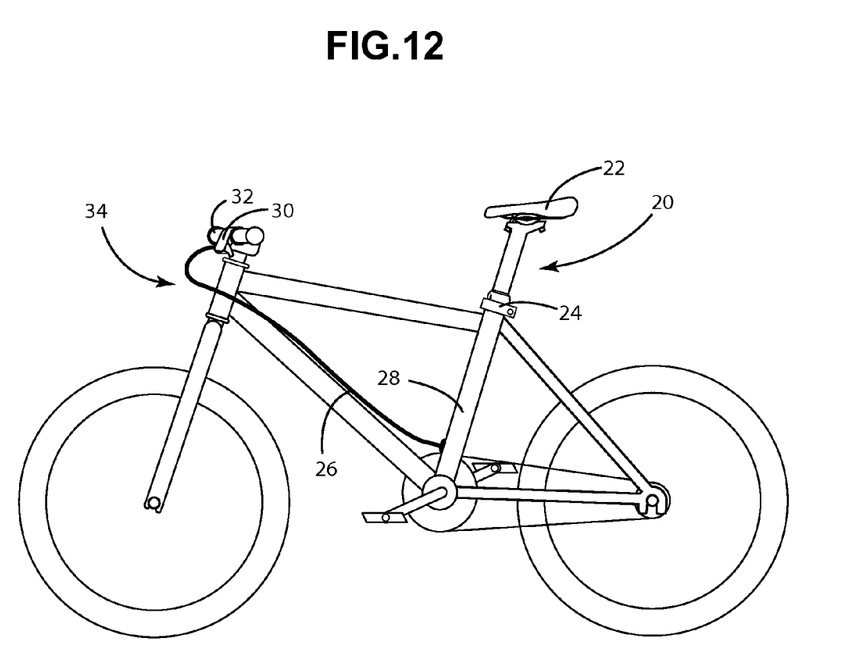
FIG. 12 is a view similar to FIG. 1 of another embodiment of the invention.

FIG. 12 presents the same embodiment of the invention as presented in FIG. 1 except that the cable housing 38 extends from the actuation lever 30 to an opening in the lower portion of the bicycle seat tube 28. In this configuration, a height adjusting seat post assembly 20 that has the cable 36 exiting from the lower portion of the insert tube 23 is possible.

Figure 13:
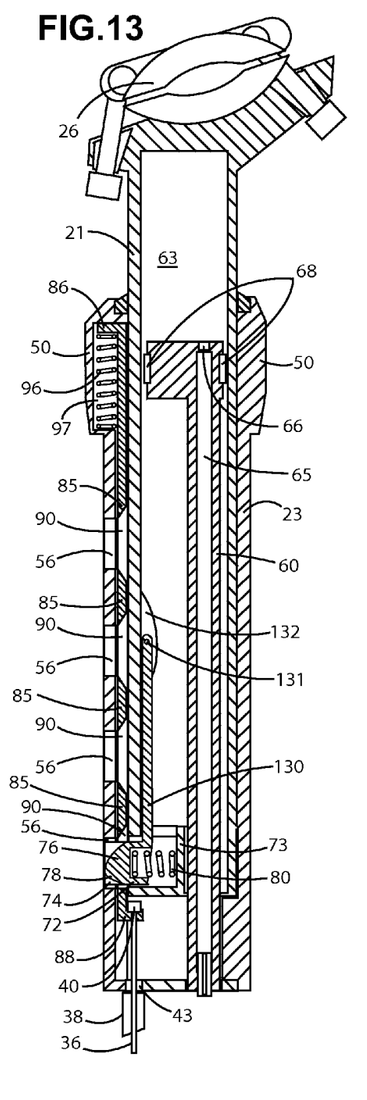
FIG. 13 is an enlarged sectioned side view of the seat post assembly illustrated in FIG. 12.
Figures 14, 15:
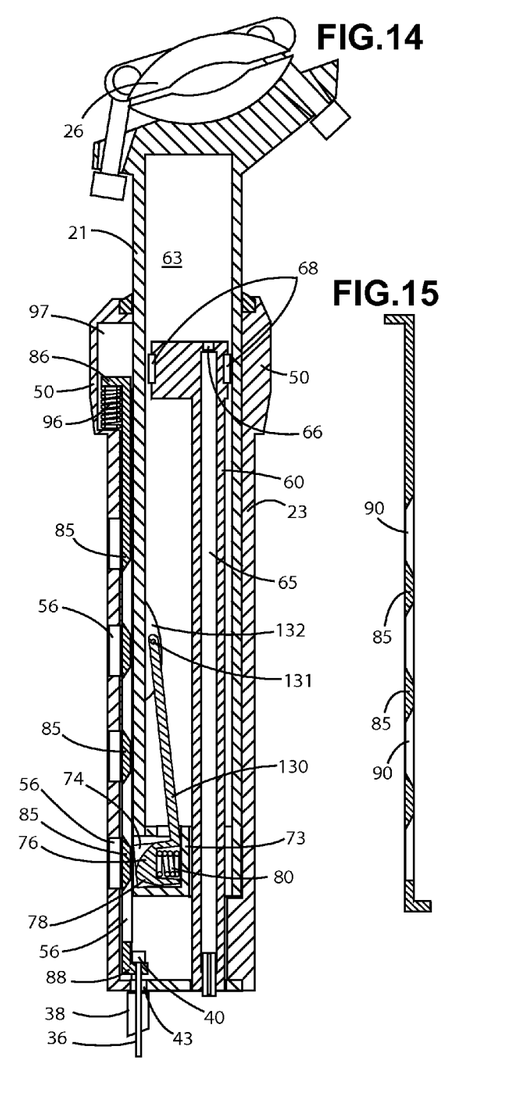
FIG. 14 is a view similar to FIG. 13 of the seat post in an unlocked position.
FIG. 15 is a sectioned side view of the spline un-locking device of FIG. 14.

The embodiment of the invention presented in FIGS. 13,14 and 15 is the same as the embodiment of the invention presented in FIGS. 2 through 9, except for a few differences.

The cable end 40 extends though the support platform opening 44 and is attached to the inward pointing holder 88. The return compression spring 96 is positioned within a smaller protrusion chamber 97. Each of the tapered wedging projections 85 has a taper at their top and bottom for smoother movement against the supplemental wedge 76. The supplemental wedge 76 is flipped over to maintain a similar locking and unlocking operation as the tapered wedging projections 85 are pulled downward rather then upward to unlock the locking dog edges 74, 74 from the lock holes 56. A connecting rod 130 extends from a pivot 131 that is attached to an inner support structure 132 that is positioned along the inner wall of the seat post 21. The connecting rod 130 connects to the locking pin 72 to give the locking pin 72 a pivotal movement rather then a linear movement. The fourth tubular structure 64 has been removed from FIGS. 13 and 14 with the perimeter air seal 68 extending out to the inner wall of the seat post 21 to form a seat post air chamber 63.

FIG. 13 shows the locking pin 72 fully engaged into one of the lock holes 56. FIG. 14 shows the tapered wedging projections 85 being pulled downward by the cable end 40 and having pushed back the supplemental wedge 76.

FIG. 15 distinctly shows the tapered form of the tapered wedging projections 85.

The embodiment of the invention presented in FIGS. 16 through 19 is the same as the embodiment of the invention presented in FIGS. 1 through 9 except for a few differences. In FIGS. 16 through 19 the second spline rod 83 is removed and a plurality of wedge shape projections 92 are used in place of the wedging projections 84. The wedge shape projections 92 are turned to point inwards, towards the seat post 21. A wedge shape is formed for the outer profile of each of the wedge projections 92. A narrower first inner groove 140 is used. The supplemental wedge 76 and slots 77,77 are removed from the locking pin 72. The inner surface of the insert tube 23 extends straight across rather then being curved just above each locking hole 56, to create more room for the wedge shaped projections 87. The front of the seat post 21 has a flat surface to accommodate the flat inner surface of the insert tube 23.

Figures 16, 17:
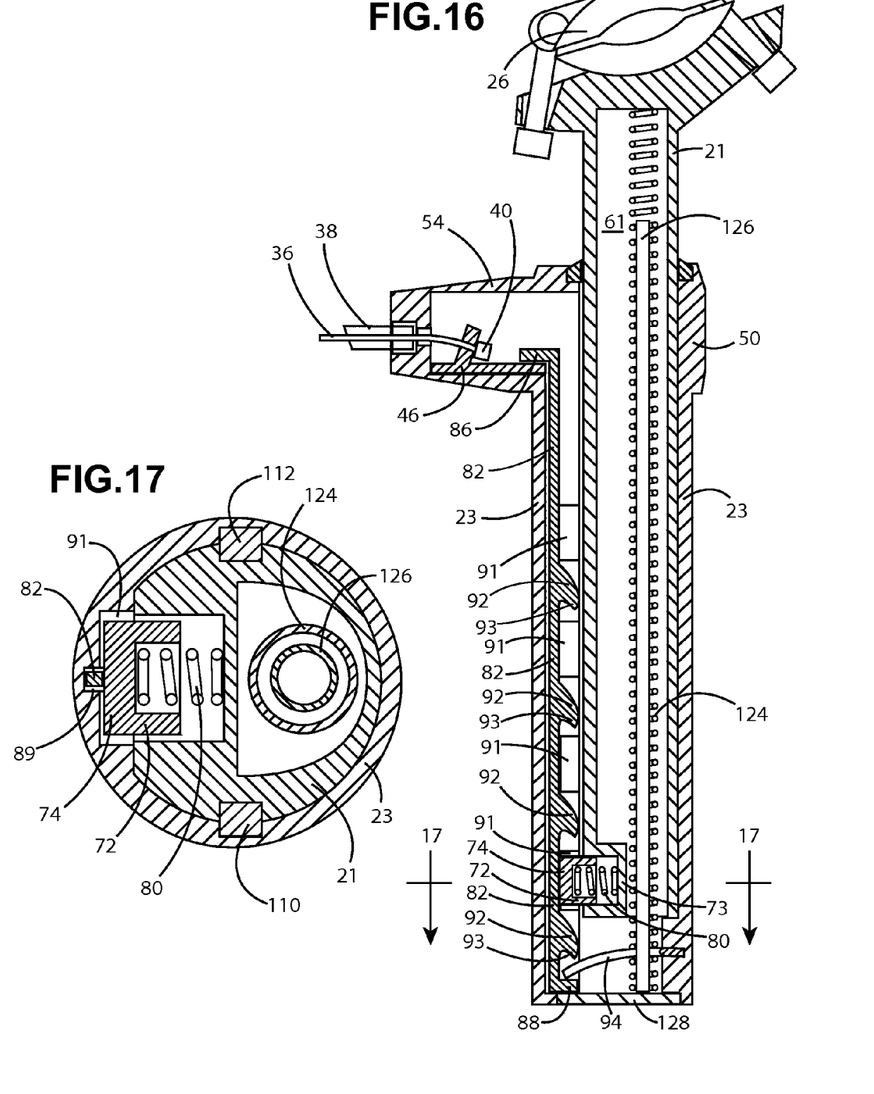
FIG. 16 is a view similar to FIG. 2 of another embodiment of the invention.
FIG. 17 is an enlarged horizontal cross-sectional view of FIG. 16 taken on line 17-17.
Figures 18, 19:
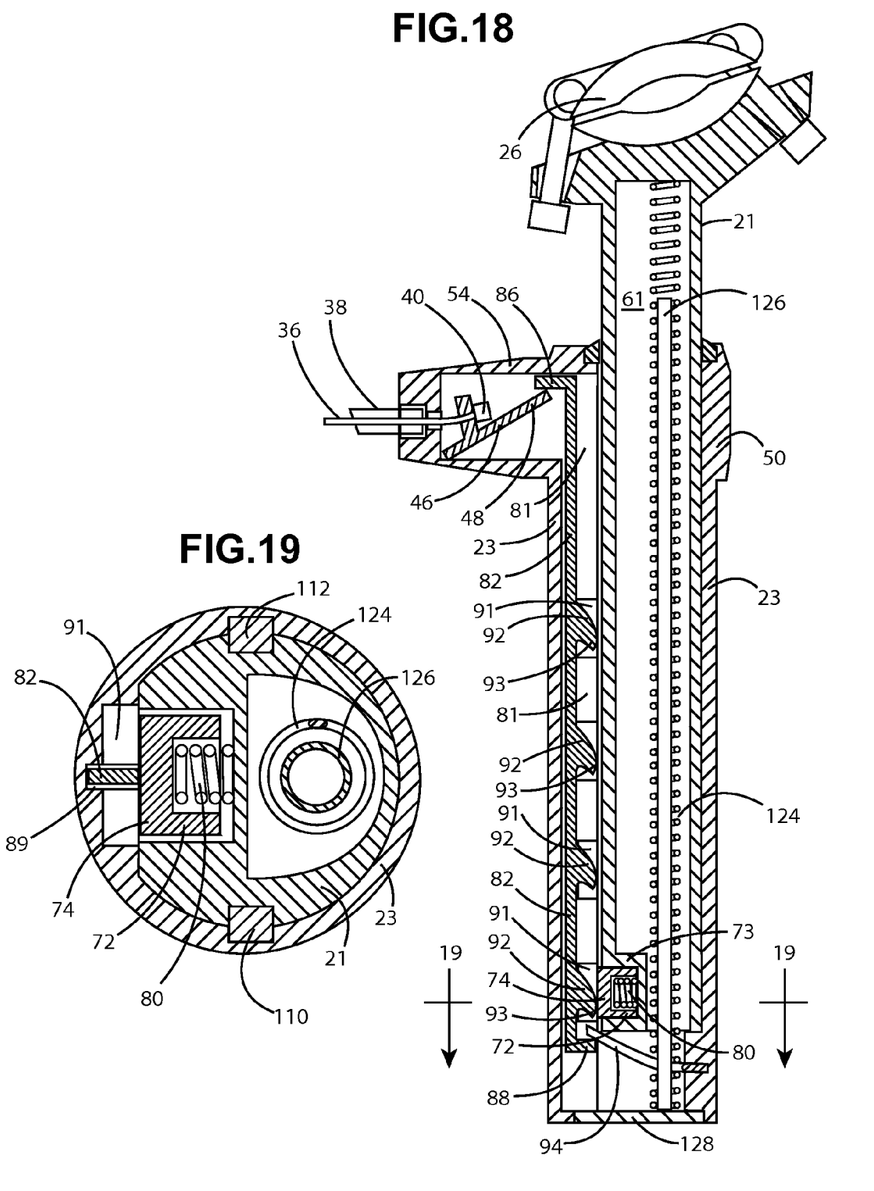
FIG. 18 is a view similar to FIG. 16 of the seatpost in an unlocked position.
FIG. 19 is an enlarged horizontal cross-sectional view of FIG. 18 taken on line 19-19.

FIGS. 16 and 17 show the seat post 21 in a locked position. FIGS. 18 and 19 show the locking pin 72 pushed back by the wedge projections 92 as the wedge shaped projections 92 are pulled upward. A return curve 93 is positioned at the outer edge of each of the wedge shaped projections 92 to enable the locking pin 72 to smoothly rise while pressing against each of the wedge projections 92.

The main air spring unit 67 presented in FIGS. 2 through 9 is replaced within the alternative embodiment presented in FIGS. 16 through 19, by a main coil compression spring 124 that has an aligning tube 126 positioned within it to keep the main compression spring 124 from deforming. The alignment tube 126 and main compression spring 124 are both contained into position by a compression spring platform 128 that is positioned at the lowest portion of the insert tube 23.

What is claimed is:

1. A bicycle seat height adjusting assembly comprising:
    an insert tube sized to be slidably receivable within a seat tube of a bicycle type apparatus, said insert tube having an inner wall and an exterior wall, said insert tube further having a lower area and an upper area;
    an axially slidable seat post positionable to different heights within said insert tube and adapted to support a bicycle seat at a top portion of said seat post;
    means for preventing said seat post from rotating relative to said insert tube;
    said seat post being substantially tubular in shape with an open bottom end, said seat post having an upper section and a lower section, said seat post having a seat post inner wall and a seat post outer wall, said seat post having an inner area within said seat post inner walls;
    a main spring positioned substantially within said insert tube and extending up into said seat post, said main spring urging said seat post in an upward direction;
    a plurality of locking holes formed longitudinally along a first side of said insert tube;
    a first longitudinal groove formed along said inner wall of said insert tube, said first longitudinal grove being set in generally corresponding alignment with said plurality of locking holes;
    a seat post locking pin and supplemental lock spring substantially positioned within said lower section of said seat post, said locking pin being sized and aligned to engage said locking holes, said locking pin having an outer end portion and an inner end portion, said locking pin having a locking dog portion located substantially at said outer end portion of said locking pin;
    a first spline rod with a plurality of wedging projections, said first spline rod with wedging projections containing said first spline rod from which each of said wedging projections protrude, said first spline rod with wedging projections being slidably positioned within said first longitudinal groove, said first spline rod with wedging projections having a total depth substantially equal to the total depth of said first longitudinal groove, each of said wedging projections being positioned in corresponding relation to each of said locking holes;
    an actuation lever being operably connected to said first spline rod with wedging projections, wherein pulling of said actuation lever moves each of said wedging projections into each said locking hole, wherein one of said wedging projections pushes said locking pin out of one of said locking holes, wherein said wedging projections are all equally drawn into each corresponding said locking hole, to fully limit said locking pin from entering into any of said locking holes and therefore allow said seat post to rise upwardly;
    a return spring means for urging said first spline rod with wedging projections in a return direction, wherein releasing of said actuation lever allows said firstspline rod with wedging projections to be urged in a return direction and cause said wedging projections to substantially withdraw from said locking holes, thereby allowing said supplemental lock spring to urge said locking dog portion back into any one of said locking holes, to thereby set said locking dog portion into a locked position, to thereby relock said seat post at a given height, whereby the height of the seat is adjusted when said first spline rod with wedging projections is moved to thereby push said locking pin out of one of said locking holes and said seat post is placed into a selected position by a cyclist's buttocks between said locked position;

a maximum height set means, whereby the operator is able to limit said seat post from rising beyond an exact, personally set, optimum height.

2. A bicycle seat height adjusting assembly according to claim 1, wherein each of said wedging projections comprises a generally wedge shape exterior, each of said wedging projections having an outer edge positioned at an outermost section of each of said wedging projections.

3. A bicycle seat height adjusting assembly according to claim 2, wherein each of said wedging projections further comprise an inward curve formed at said outer edge of each said wedging projection, whereby said locking pin is able to slide up and over each said wedging-shaped exterior as said locking pin rises with said seat post.

4. A bicycle seat height adjusting assembly according to claim 1, wherein said locking pin further comprises a supplemental wedge formed adjacent to said locking dog portion of said locking pin, said wedging projections and said first spline rod being positioned substantially within said first longitudinal groove, said supplemental wedge being set in alignment with said wedging projections, open spaces are positioned and sized between each of said wedging projections to allow said supplemental wedge to pass between said wedging projections when said locking dog portion is in said locked position, wherein the cyclist moving said actuation lever causes one of said wedging projections to push back said supplemental wedge and thereby unlock said locking dog portion from said locking holes, whereby release of said actuation lever by the cyclist allows said wedging projections to move away from said locking holes to thereby allow said supplemental wedge to re-enter into one of said open spaces and simultaneously allow said locking dog portion to relock into one of said lock holes.

5. A bicycle seat height adjusting assembly according to claim 4, further comprising a first vertical slot formed substantially through said outer end portion of said locking pin, said first vertical slot formed between said locking dog portion and said supplemental wedge, said first vertical slot being sized and aligned to allow said first spline rod to enter into said first vertical slot and thereby further enable said locking dog portion to enter into one of said locking holes.

6. A bicycle seat height adjusting assembly according to claim 5, further comprising a second spline rod, said wedging projections connecting from said first spline rod to said second spline rod with said open spaces positioned between each of said wedging shapes to allow said supplemental wedge to pass through said open spaces when said locking dog portion is in said locked position, whereby said second spline rod adds strength and support to said first spline rod with wedging projections.

7. A bicycle seat height adjusting assembly according to claim 6, further comprising a second vertical slot and a second locking dog portion that is positioned at said outer end portion of said locking pin, said second vertical slot being formed between said second locking dog portion and said supplemental wedge, said second vertical slot being sized and aligned to allow said second spline rod to enter into said second vertical slot and thereby further enable said first and second locking dog portions to enter into one of said locking holes.

8. A bicycle seat height adjusting assembly according to claim 6, wherein each of said wedging projections are flat and equally thick pieces of material that extend from said first spline rod to said second spline rod, said wedging projections having outer edges.

9. A bicycle seat height adjusting assembly according to claim 8, wherein each of said wedging projections further comprise a taper formed at said outer edges of each said wedging shape whereby said supplemental wedge is able to slide up and over each said wedging projection as said locking pin rises with said seat post.

10. A bicycle seat height adjusting assembly according to claim 6, wherein said supplemental wedge comprises a generally wedge shaped exterior, said supplemental wedge having an outer edge portion.

11. A bicycle seat height adjusting assembly according to claim 10, wherein said supplemental wedge further comprises an inward curve formed at said outer edge portion of said supplemental wedge, whereby said supplemental wedge is able to slide up and over each said wedging projection as said locking pin rises with said seat post.

12. A bicycle seat height adjusting assembly according to claim 5, wherein each of said locking holes are divided into two or more locking holes to thereby accommodate and support said locking dog portion and said supplemental wedge separately.

13. A bicycle seat height adjusting assembly according to claim 1, wherein said main spring comprises a third tubular structure having a substantially open top end and a substantially closed bottom end, said third tubular structure being substantially connected to said lower area of said insert tube, said third tubular structure being substantially similar in length to said insert tube, said third tubular structure thereby extending lengthwise into said seat post inner area of said seat post, said third tubular structure having a substantially open top end, said substantially open top end of said third tubular structure having a perimeter area positioned around the substantially open top end, an air seal positioned around the perimeter area of the substantially open top end of said third tubular structure, wherein pressurized air is not able to pass between said inner walls of said seat post and said air seal to form a first air chamber within said seat post and a second air chamber within said third tubular structure, said substantially open top end of said third tubular structure allowing the flow of said pressurized air between said first air chamber and said second air chamber to thereby create a main air spring with a very even spring rate, urging said seat post upwardly relative to said insert tube; said substantially open top end of said third tubular structure being sized to control the rate of air flow between said first air chamber and said second air chamber to thereby create a dampening effect on the speed at which said seat post is able to rise; an air valve, positioned substantially through the bottom end of said third tubular structure, communicating with said first air chamber and said second air chamber, said air valve containing means for controlling a supply of pressurized air within said first air chamber and said second air chamber.

14. A bicycle seat height adjusting assembly according to claim 13, wherein said main air spring further includes a fourth tubular structure having a closed top end and an open bottom end that is fully and slidably positioned within the seat post inner walls of said seat post, said third tubular structure being slidably and partially positioned within said fourth tubular structure, whereby said main air spring becomes a removable air spring cartridge.

15. A bicycle seat height adjusting assembly according to claim 1, wherein said maximum height set means comprises a second groove formed lengthwise along a second side of said inner wall of said insert tube, said second groove having a top surface, said second groove having second walls that define said second groove, a plurality of threaded post holes being positioned along a second side of said seat post outer wall of said seat post, said plurality of threaded post holes positioned in said lower section of said seat post, said threaded post holes positioned in alignment with said second groove; a maximum height set screw that is sized to be removably receivable within any of said threaded post holes, a portion of said maximum height set screw is positioned within said second groove to limit the upward movement of said seat post upon said maximum height set screw engaging said top surface of said second groove, whereby the operator is able to limit said seat post from rising beyond an exact, personally set, maximum height.

16. A bicycle seat height adjusting assembly according to claim 15, further including an access opening formed through said insert tube, whereby said maximum height set means is accessible to allow for adjustment of said maximum height set means.

17. A bicycle seat height adjusting assembly according to claim 16, wherein said preventing means against rotation of said seat post comprises a seat post boss that is positioned on said seat post outer wall, said seat post boss being further positioned in said lower section of said seat post, said seat post boss is positioned in alignment with said second groove and extends into said second groove, whereby said seat post boss is prevented against rotation by said second walls that define said second groove.

18. A bicycle seat height adjusting assembly according to claim 17, wherein said seat post boss includes a ball bearing sized to be wider then said second groove, said ball bearing thereby rolling partially within said second groove, said ball bearing being pressed against said second groove by a supplemental bearing spring, and thereby further preventing said seat post from rotating relative to said insert tube.

19. A bicycle seat height adjusting assembly according to claim 1, wherein said preventing means against rotation for said seat post comprises a third groove that is formed lengthwise along said inner wall of said insert tube, a second boss is positioned on said seat post outer wall, said second seat post boss being further positioned in said lower section of said seat post and is positioned in alignment with said third groove, said second boss extending into said third groove, whereby said seat post boss is further prevented against rotation by said third groove.

20. A bicycle seat height adjusting assembly according to claim 19, wherein said second seat post boss comprises a second ball bearing sized to be wider then said third groove, said second ball bearing being pressed against said third groove by a second supplemental bearing spring, said second ball bearing thereby rolling partially within said third groove, to thereby further prevent said seat post from rotating relative to said insert tube.

21. A bicycle seat height adjusting assembly according to claim 1, wherein said maximum height set means comprises the insert tube being positioned at a given height within said seat tube of the bicycle frame, to thereby set said seat at a rider's preferred maximum height.

22. A bicycle seat height adjusting assembly according to claim 1, wherein said first spline rod with wedging projections is oriented to be pulled in a downward direction to thereby push said locking pin out of said locking holes.

23. A bicycle seat height adjusting assembly according to claim 1, wherein said first spline rod with wedging projections is oriented to be pulled in an upward direction to thereby push said locking pin out of said locking holes.

24. A bicycle seat height adjusting assembly according to claim 1, wherein said actuation lever is generally connected by a cable with an outer housing or a hydraulic type connective line to said first spline rod with wedging projections, said actuation lever being positionable on the handlebars of said bicycle type apparatus.

25. A bicycle seat height adjusting assembly according to claim 24, wherein said cable or hydraulic type connective line is attached to said first spline rod through said upper area of said insert tube.

26. A bicycle seat height adjusting assembly according to claim 24, wherein said cable or hydraulic type connective element is attached to said first spline rod through an opening in the bicycle frame that extends into the lower area of said insert tube.

27. A bicycle seat height adjusting assembly according to claim 1, wherein said locking pin is slidably contained within a linearly aligned housing.

28. A bicycle seat height adjusting assembly according to claim 1, wherein said locking pin is contained within a pivoting support structure.

29. A bicycle seat height adjusting assembly according to claim 1, further containing a wiper seal positioned at said upper area of said insert tube, said wiper seal being further positioned around said seat post, whereby said wiper seal wipes off dirt from said seat post as said seat post is lowered.

30. A bicycle seat height adjusting assembly according to claim 1, further containing an outer collar section formed substantially around said upper area of said insert tube to limit the amount said insert sleeve will lower into said bicycle seat tube.

31. A bicycle seat height adjusting assembly according to claim 1, wherein said locking pin contains a square profile, said outer end portion of said locking pin further being formed as a curve, whereby said locking pin is able to be fully pushed out of said locking holes while said seat post and said insert tube have a substantially circular configuration.

32. A bicycle seat height adjusting assembly according to claim 1, wherein said main spring contains a compression spring.

* * * * *